Patented Dec. 24, 1940

2,226,202

UNITED STATES PATENT OFFICE 2,226,202

SYNTHETIC RESINOUS MATERIALS

Arthur Hill and Eric Everard Walker, Blackley, Manchester, England, assignors to Imperial Chemical Industries Limited, a corporation of Great Britain No Drawing. Application March 7, 1938, Serial No. 194,517. In Great Britain March 9, 1937

3 Claims. (Cl. 260—42)

This invention relates to the manufacture of new synthetic resinous materials and also to the manufacture of new lacquers comprising the said new resinous materials dissolved in organic solvents.

This invention has as an object to provide new synthetic resinous materials. A further object is to provide new synthetic resinous materials which will be useful as ingredients of paints, varnishes, lacquers, baking lacquers and like coating compositions. A still further object is to devise methods of manufacturing such new synthetic materials. A still further object is to provide new paints, varnishes, lacquers, baking lacquers, and coating compositions. A still further object is to devise methods of manufacturing such paints, varnishes, lacquers, baking lacquers, and coating compositions. Further objects will appear hereinafter.

These objects are accomplished by the following invention. We have found that we can manufacture new synthetic resinous materials by reacting together, in the presence of a suitable alcohol solvent as hereinafter defined and in presence of an acid or acid-yielding catalyst, a product obtainable by the alkaline condensation of formaldehyde with a carbamic ester of the formula R—O—CO—$NH_2$, wherein R stands for an alkyl group of three or more carbon atoms, a cycloalkyl or an aralkyl group or for the group R'—(O—R'')$_n$ wherein R' is an alkyl group, R'' is an alkylene group and $n$ is 1 or 2, and a product obtainable by the alkaline condensation of formaldehyde with urea and removing the water of reaction so formed.

The invention may be carried into effect in various ways. For example, the requisite alkaline condensation products may be separately prepared and, if desired, isolated before reacting them together in accordance with the invention. Thus, for example, a separately prepared and isolated N-methylol butyl carbamate (see British Specification 309,108) and a separately prepared and isolated dimethylolurea may be reacted together in a suitable alcohol and in presence of an acid catalyst. On the other hand, as a matter of technical convenience, there may be used as raw material a crude mixture of alkaline condensation products such as can be obtained, for example, by heating a mixture of urea and a suitable carbamate with formaldehyde under alkaline conditions in a suitable alcohol solvent. The crude mixture so-obtained is then neutralized and the process of the invention then proceeded with by further heating in the presence of an acid catalyst.

In general it is preferred to use one molecular proportion of alkaline condensation product of carbamate and formaldehyde to three or more molecular proportions of alkaline condensed urea-formaldehyde. A ratio of one molecular proportion to four molecular proportions gives a highly desirable combination of flexibility and hardness in the resulting resinous materials.

Water of reaction may conveniently be removed by distillation either during the reaction or when the reaction is completed. Thus, for example, the water of reaction may be removed by distilling as an azeotropic mixture with the alcohol employed as solvent where the latter permits of such mixtures being formed. When the alcohol used is miscible with water it is convenient to add to the reaction mixture before distillation an aromatic hydrocarbon, such as benzene, toluene or xylene to assist in the entrainment and separation of the water. This has as a result that the liquid distilled over is a ternary mixture from which the water separates out on standing. The condensing apparatus may then be arranged so that the water is separated off from below while the mixture of the other two components is returned continuously or discontinuously to the reaction vessel.

When the water of reaction is removed there is obtained a solution of the new resinous material in an alcohol. Where it is desired to obtain the new resinous materials in a solid form the alcohol may be removed by distillation. As the new synthetic resinous materials have heat-hardening properties, particularly under acid conditions, it will be obvious to those skilled in the art that where it is desired to distil off the whole of the alcohol it is advantageous first to neutralize any acidity such as that arising from the catalyst employed in the original reaction. It is also advantageous to carry out the distillation under diminished pressure where all the solvent is to be removed. Where only part of the solvent is to be removed distillation may be conveniently and effectively carried out under atmospheric pressure. For many technical uses it is not necessary to remove the whole of the alcohol. Thus, any desired proportion of the alcohol may be removed and the residue diluted with other desired solvents such as, for example, white spirit, toluene, xylene and turpentine, thereby producing valuable lacquers. Other lacquer ingredients such as plasticizers or softeners, for example, dibutyl phthalate, tricresyl phosphate or castor oil, other film-forming materials, for example drying oils, alkyd resins, nitrocellulose, benzyl cellulose, and colouring matters may also be added if desired.

The invention is illustrated but not limited by the following examples in which the parts are by weight.

*Example 1*

To a butyl alcohol solution of a mixture of condensation products of formaldehyde with urea and n-butyl carbamate respectively which is obtained as described below there are added 3 parts of phthalic anhydride and the resulting mixture which quickly becomes acid is heated for 4 hours at 95°–100° C. under a reflux condenser. The reflux condenser is then removed and arranged for distillation. At first a mixture of butyl alcohol and water formed in the reaction distils, followed later by butyl alcohol alone. The distillation is then continued until a total distillate of 280 parts, consisting of about 26 parts of an aqueous layer and about 254 parts of a butyl alcohol layer has been collected. The new synthetic resinous material remains behind together with some butyl alcohol as a clear, almost colourless viscous syrup. This syrup may be diluted with aromatic hydrocarbon solvents to yield baking lacquers. The films made by baking such a lacquer are more flexible than similar films made from an unmodified urea-formaldehyde resin.

The butyl alcohol solution of mixed condensation products which is used in the above example is prepared as follows.

120 parts of urea and 444 parts of n-butyl alcohol are boiled together, with stirring, under a reflux condenser. The gases containing ammonia passing from the top of the reflux condenser are absorbed in dilute sulphuric acid containing 19.6 parts 100% sulphuric acid. The boiling is continued until the ammonia evolved is just sufficient to neutralize the sulphuric acid as determined by methyl orange indicator. The butyl alcohol solution containing n-butyl carbamate and excess urea thus obtained is then cooled, 110 parts of para-formaldehyde and 2 parts of 30% aqueous ammonia added and the mixture heated for 4 hours at 95°–100° C.

*Example 2*

A new synthetic resinous material is prepared as described in Example 1 up to the stage where the distillation is to be continued. Sufficient sodium bicarbonate is added to the total reaction product to make it neutral to bromo thymol blue. The neutral mixture is then filtered and the clear filtrate distilled under atmospheric pressure until the residue begins to thicken. The distillation is then continued under diminished pressure (10–15 mm. mercury pressure) and at a temperature of 120°–125° C. until distillation ceases. The residue when cooled is a very pale, almost colourless solid resin which may be dissolved in aromatic hydrocarbons to form lacquers. The resin may also be used in conjunction with other film-forming materials, e. g. alkyd resins, nitrocellulose and benzyl cellulose in the formulation of lacquers or enamels.

*Example 3*

30 parts of urea and 475 parts of n-butyl alcohol are boiled with stirring under reflux for 30 hours. The solution is then cooled and filtered. The filtrate consists mainly of a solution of butyl carbamate in butyl alcohol (see Organic Syntheses, vol. IX, p. 24, Editor J. B. Conant, New York and London, 1929). 12 parts of para-formaldehyde and 2 parts of 32% aqueous ammonia are added and the mixture heated in a boiling water bath under reflux for 4 hours, whereby a butyl alcohol solution of alkaline condensation products from n-butyl carbamate and formaldehyde is obtained. 5 parts of phthalic anhydride and 180 parts dimethylol urea are then added and the now slightly acid mixture is heated for 4 hours at 98–100° C. The reflux condenser is then removed and arranged for distillation. The reaction mixture is heated until 150 parts distillate have distilled over. The distillate consists of approximately 36 parts of an aqueous layer and 114 parts of a butyl alcohol layer. The residue in the distillation vessel is filtered to yield a clear viscous syrup which may be diluted with aromatic hydrocarbon solvents to yield baking lacquers possessing properties similar to those described in Example 1.

*Example 4*

44 parts of amyl carbamate (M. P. 51°–52° C.), 10 parts of para-formaldehyde, 2 parts of ammonia (sp. gr. 0.880) and 400 parts of n-butyl alcohol are heated together in a reflux apparatus with stirring at 98–100° C. for 4 hours. To the resulting butyl alcohol solution of an alkaline condensation product from amyl carbamate and formaldehyde there are then added 4 parts of phthalic acid and 160 parts of dimethylol urea. The resulting mixture, which is slightly acid, is then heated for 4 hours at 98–100° C. The reflux condenser is then removed and arranged for distillation. The total reaction product is heated to about 100° C. so that a steady distillation of water and butyl alcohol in azeotropic mixture begins. As the distillation proceeds the temperature of the residue in the distillation vessel rises to 117° C. by which time all the water of reaction has been removed. The residue on cooling consists of a clear viscous liquid which may be diluted with aromatic hydrocarbons, or with turpentine, to form lacquers which when applied and then stoved at 100°–130° C. set rapidly to films which have good resistance to discolouration by heat and good water resistance.

If in this process instead of the amyl carbamate there are used 50 parts of benzyl carbamate or 59 parts of the carbamate of the monoethyl ether of diethyleneglycol, resinous products are obtained with properties similar to those of the amyl carbamate resin described above.

*Example 5*

52 parts of methylcyclohexyl carbamate (M. P. 53°–55° C. made from a commercial mixture of methylcyclohexanols) are used in place of 44 parts of amyl cabamate in the process of Example 4. A new synthetic resinous material is obtained which when diluted with hydrocarbon solvents (e. g. toluene) to form lacquer gives films which when baked at 100° C. have excellent flexibility.

*Example 6*

44 parts of the carbamate of ethylene glycol monoethyl ether (M. P. 55°–57° C.) are used in place of 44 parts of amyl carbamate in the process of Example 4. A new synthetic resinous material having similar valuable characteristic is obtained.

*Example 7*

39 parts of dodecyl carbomate (M. P. 78° C.), 5 parts of p-formaldehyde, 200 parts of butyl alcohol and 1 part of aqueous ammonia (sp. gr. 0.880) are mixed and heated together at 95°–100° C. for 4 hours in a vessel provided with a reflux condenser. There are then added 60 parts of dimethylol urea and 1.5 parts of phthalic anhydride and the now acid reaction mixture is heated at 95°–100° C. for a further 4 hours. The reflux condenser is then removed and arranged for distillation and the reaction mixture is distilled at atmospheric pressure. At first the distillate consists of an azeotropic mixture of butyl alcohol and water, but as distillation proceeds the proportion of water diminishes until finally only butyl alcohol distils over. At this point the distillation is stopped. The residue remaining in the still is now a viscous syrup which may be diluted with aromatic hydrocarbon solvents to form a baking lacquer.

This dodecyl carbamate resin is characterised by the fact that it is compatible with drying oils, such as linseed oil, linseed stand oils or tung oil and may therefore be used in conjunction with such oils in making oil varnishes. The preparation of such an oil varnish is described in the following example.

*Example 8*

A dodecyl carbamate resin is prepared as described in Example 7 up to the point where distillation of the azeotropic mixture of butyl alcohol and water ceases and butyl alcohol alone distils over. The distillation is then continued, butyl alcohol being removed until a sample of the residue on cooling is a soft, sticky resin. There is then added a weight of linseed oil equal to the weight of the residue then remaining and the mixture is heated at 130°–140° C. for ½-hour. There is thus obtained a pale yellow viscous oil which can be diluted with aromatic hydrocarbon solvents to give an oil varnish.

Instead of the starting materials used in the above examples we may use the alkaline condensation products from formaldehyde and such alkyl, cycloalkyl and aralkyl carbamates as, for example, propyl, amyl, butyl, benzyl and methylcyclohexyl carbamates, or alternatively those from formaldehyde and carbamic esters of ether alcohols such as, for example, the monoethyl or monobutyl ethers of ethylene glycol or the monoethyl ether of diethylene glycol.

As examples of products obtainable by the alkaline condensation of formaldehyde and carbamates as defined there may be mentioned N-methylol carbamates and N-methylolmethylene dicarbamic esters (see Einhorn and Hamburger, Liebig's Annalen, 361, 130 and also British Specification 309,108). Examples of products obtainable by the alkaline condensation of urea and formaldehyde are dimethylolurea and monomethylolurea.

As acid or acid-yielding catalysts we may use, for example, organic carboxylic acids such as phthalic, citric, maleic, succinic, lactic acids or anhydrides of these such as phthalic anhydride.

The amount of catalyst which must be used to give the best results varies with the nature of the catalyst. In the case of phthalic acid, for example, a convenient amount is about .25% to 2.5% on the total weight of alkaline condensed products which are to be reacted.

Alcohols suitable to be used as solvents in the process of the invention are aliphatic monohydric alcohols containing three to five carbon atoms or alkyl monoethers of aliphatic dihydric alcohols, for example, the monoethyl ethers of ethylene glycol and diethylene glycol.

The new synthetic resinous materials are valuable ingredients of paints, varnishes, lacquers and other coating compositions. They have good solubility in aromatic hydrocarbon solvents and will tolerate greater amounts of white spirits and of turpentine than will unmodified urea-formaldehyde products. They have good film-forming properties and yield films of greater flexibility than resins made from urea and formaldehyde alone. As already indicated the new synthetic resinous materials have heat-hardening properties and yield useful baking lacquers.

As many apparently widely different embodiments of this invention may be made without departing from the spirit and scope thereof, it is to be understood that we do not limit ourselves to the specific embodiments thereof except as defined in the appended claims.

We claim:

1. Process for the manufacture of new synthetic resinous materials which comprises causing to interact, in presence of an alcohol solvent selected from the class consisting of aliphatic monohydric alcohols containing from three to five carbon atoms and alkyl monoethers of aliphatic dihydric alcohols, and in presence of an acid catalyst, a product obtained by the alkaline condensation of formaldehyde with urea and a product obtained by the alkaline condensation of formaldehyde with a carbamic ester of the formula R—O—CO—NH$_2$ wherein R stands for a group selected from the class consisting of alkyl groups of three or more carbon atoms, cycloalkyl groups, aralkyl groups, and groups of the formula R'—(O—R'')$_n$— wherein R' is an alkyl group, R'' is an alkylene group and $n$ is an integer of at least 1 and not greater than 2, said first mentioned product being in preponderant amount and removing the water of reaction so formed.

2. Process as claimed in claim 1 wherein for each molecular proportion of alkaline condensed formaldehyde-carbamic ester product there are used three or more molecular proportions of alkaline condensed urea-formaldehyde product.

3. A heat-hardening resinous product obtained by the process set forth in claim 1.

ARTHUR HILL.
ERIC EVERARD WALKER.